United States Patent [19]
Terada et al.

[11] Patent Number: 5,281,126
[45] Date of Patent: Jan. 25, 1994

[54] BLOW MOLDING DIE

[75] Inventors: Sachio Terada; Kazunari Kirimoto; Yoshiaki Kanoh; Takayuki Shibata, all of Ube, Japan

[73] Assignee: Ube Industries, Ltd., Ube, Japan

[21] Appl. No.: 21,556

[22] Filed: Feb. 24, 1993

[30] Foreign Application Priority Data

Feb. 25, 1992 [JP] Japan .................................. 4-86683
Mar. 27, 1992 [JP] Japan ................................. 4-102284

[51] Int. Cl.$^5$ ............................................. B29C 49/04
[52] U.S. Cl. .................................. 425/532; 425/380; 425/467
[58] Field of Search .............. 425/532, 380, 461, 466, 425/467

[56] References Cited

U.S. PATENT DOCUMENTS

| | | | |
|---|---|---|---|
| 3,317,955 | 5/1967 | Schurman et al. | 425/532 |
| 3,981,672 | 9/1976 | Wilson | 425/467 |
| 4,063,865 | 12/1977 | Becker | 425/467 |
| 4,097,214 | 6/1978 | Hsu | 425/466 |
| 4,185,954 | 1/1980 | Murakami et al. | 425/467 X |
| 4,201,534 | 5/1980 | Phipps | 425/461 |
| 4,298,325 | 11/1981 | Cole | 425/466 X |
| 4,305,902 | 12/1981 | Uhlig | 425/532 X |
| 4,422,838 | 12/1983 | Iwawaki et al. | 425/532 X |
| 4,657,718 | 4/1987 | Sicka et al. | 425/380 X |
| 4,687,430 | 8/1987 | Morris et al. | 425/380 X |
| 4,731,216 | 3/1988 | Topolski | 425/380 X |
| 4,738,611 | 4/1988 | Briggs | 425/532 X |
| 4,798,528 | 1/1989 | Hattori et al. | 425/461 X |
| 5,206,032 | 4/1993 | Bock | 425/532 X |

FOREIGN PATENT DOCUMENTS

| | | |
|---|---|---|
| 58-96528 | 6/1983 | Japan . |
| 62-174128 | 7/1987 | Japan . |
| 62-251104 | 10/1987 | Japan . |
| 62-267105 | 11/1987 | Japan . |

OTHER PUBLICATIONS

Z. Tadmor et al., Principles of Polymer Processing, pp. 522-528.
Plastic, vol. 41, No. 12, pp. 94-103.
Plastic, vol. 42, No. 5, pp. 64-71.
R. Rakos et al., "Design and Optimization of Extrusion Dies Using Computer Based Simulations," Advances in Polymer Technology, vol. 10, No. 4, pp. 297-307.
B. Arpin et al., "Simulation of Polymer Flow Through a Coat-Hanger Die: A Comparison of Two Numerical Approaches," Polymer Engineering and Science, vol. 32, No. 3, mid-Feb. 1992, pp. 206-212.

Primary Examiner—Richard L. Chiesa
Attorney, Agent, or Firm—Finnegan, Henderson, Farabow, Garrett & Dunner

[57] ABSTRACT

A blow molding die includes a housing, and a mandrel with a core integrated therewith, combined to form a vertically extending annular melt passage communicating with a hole formed at its top portion for feeding a plasticized resin melt from an extruder, and terminating at die lips formed at its free bottom end. The mandrel has a pair or grooves symmetrical relative to its axis, formed at its peripheral surface so as to have hanger type profiles in its front developed view, and connecting to each other at lower ends thereof. The feed hole opens to the symmetrical hanger type grooves at top and central points thereof. Each groove has an arced surface and a cross-sectional area decreasing in a direction from the top and central point to the lower end. A single circumferential dam is formed at the peripheral mandrel surface below the grooves, and a pair of lower lands defined between the grooves and the dam are formed, while an upper land is formed above the grooves, so that the grooves are defined between the upper and lower lands and connect to the dam at the lower ends. The grooves, the lower lands and the dam have radial depths from a peripheral surface of the upper land, the lower land depth being smaller than the groove depth but larger than the dam depth over the entire periphery, while the upper land is sealingly fitted to an inner peripheral surface of the housing.

11 Claims, 7 Drawing Sheets

BLOW MOLDING DIE

BACKGROUND OF THE INVENTION

1. Field of the Invention

The present invention relates to an improved die for use in blow molding, preferably with a resin that is a so-called "engineering plastic", for producing a parison having an elliptical annular profile, in a cross-sectional view, which parison is preferably blow molded to produce a hollow double wall type plastic article having a basically concave, convex or bowl shape or a panel shape with a hollow double wall.

2. Description of the Related Art

A typical conventional die for use in blow molding comprises a vertically extending tubular housing and an integrated combination of a mandrel and a core, mounted in the housing to thus define a peripheral space gap therebetween providing an annular and axial melt passage. The die has a feed hole for feeding the melt from an extruder, which hole communicates with the melt passage. The melt passage forms die lips defined by the core and the housing at a lower free end of the die, through which a parison of the melt is provided for the blow molding. The mandrel has the feed hole formed such that it has an inlet opening at a top end portion of the mandrel and is branched to form a pair of diametrically opposite outlet openings in the top end portion at a peripheral surface thereof.

The mandrel has a pair of grooves symmetrical relative to its axis, each having a curved upper edge of an upwardly convex form and a horizontally straight edge with a substantially flat bottom surface therebetween, in a developed front view of the mandrel, so that it has an arc or semi-circle type profile. The paired grooves are connected to and communicate with each other at their opposite lower ends, while the feed outlet openings communicate with the grooves at top and central points thereof, respectively. Each groove has an upper side surface arced in a cross-sectional view, which surface is defined between the upper edge and the bottom surface, and has a cross-sectional area decreasing in a direction from the top and central point toward each lower end. The mandrel has symmetrical isolated lands or islands formed in the flat grooves (which may be called "seas") immediately below the feed outlet openings at the top and central points, respectively, so that the melt from each feed outlet opening is divided into two streams at the island in the groove.

The mandrel has a circumferential flat land upwardly adjacent to the flat grooves at the upper edge thereof. This flat land and the paired islands are sealingly fitted to an inner peripheral surface of the housing.

The mandrel has multi-staged straight dams extending radially and peripherally for a downward melt flow with circumferential straight grooves defined therebetween. The melt passage is defined between a portion of a peripheral surface of the mandrel forming the grooves, the islands and the dams, and a corresponding portion of the inner peripheral surface of the housing.

The entire melt passage has an upper zone having a circular periphery, a lower elliptical periphery zone and an intermediate transitional zone therebetween. The lower elliptical zone is defined by a lower section of the mandrel and the core integrated therewith, and a lower section of the housing therebetween, and terminates at die lips which have an elliptical annular profile and open at a free lower end of the die.

The lower housing section and the core are replaceable parts to be connected to the upper housing section and the mandrel, respectively, and they are designed in respect of their profiles and sizes so that the melt is ejected from the die lips to form a parison having a desired profile and size for use in producing blow molded articles having a specific profile and size.

With the above conventional die, there are the following problems:

The die is required to have a pressure loss of the melt from the extruder to the die lips distributed over the entire periphery of the melt passage at the die lips as uniformly as possible, in order to obtain a parison having a desired profile and size as expected at a predetermined melt extrusion rate. In order to obtain such a desired parison, the upper circular melt passage zone must be provided so as to have a pressure loss of the melt from the extruder to a lower end of the upper zone distributed over the entire circular periphery of the upper zone at the lower end thereof as uniformly as possible. However, according to the conventional die, a degree of the uniformity of the pressure loss distribution is improved as the number of the multi-staged dams is increased, but it is noted that the increased number results in enlarging the die in respect of a vertical length thereof, and increasing the pressure loss per se. These results require an increased power extruder and an enlarged die, and thus are economically disadvantageous.

Further, even if the uniform distribution of the pressure loss in the upper melt passage zone is attained, this does not ensure that the pressure loss at the die lips is distributed uniformly, except for a case where the die lip profile is circular. Therefore, in a case of an elliptical die lip profile, it is required to design the core and the lower housing part so that they render the melt from the upper melt passage zone to be ejected from the die lips through the intermediate and lower melt passage zones with a uniform pressure loss at the die lips. Such a design is difficult and troublesome, and is required every time a desired parison is changed in respect of its profile and size. Further, an operation of exchanging the lower housing part is also troublesome, since such a part is generally heavy, relative to the core.

In a blow molding operation using a parison having a specific profile and size, there may often occur cases where a resin of a product is changed to another kind of material or the resin is the same but a color of the resin is changed. If such a resin change or resin color change is required, it is desired that an old resin remaining in the die be completely discharged by extruding a new resin melt through the die with amounts of the new resin being wasted and, time and load required in this transitional operation should be as low as possible. However, with the conventional die, the old melt is apt to remain in various local places in the melt passage of the die, particularly a place immediately below the islands, the lower ends of the flat grooves connected to each other, the straight grooves, and local portions of the inner peripheral surface of the housing with relatively large radial space gaps from the mandrel. In this regard, it is desired to improve the die so that such melt remaining portions in the die are diminished and/or the old melt can be completely discharged with decreased amounts of the wasted new melt, and the time and load required in such a transitional operation.

SUMMARY OF THE INVENTION

An object of the present invention is to provide a die improved so that the above mentioned problems involved in the conventional die are solved or eliminated in practice.

According to the present invention, there is provided a die comprising a corresponding housing, mandrel and core, which die is different from the conventional die in that the mandrel has, in place of the flat semi-circle type grooves, a pair of grooves symmetrical relative to its axis, each having an arced surface in a cross-sectional view. The arced grooves extend oppositely sidewards and downwards in a developed front or side view of mandrel such that it has a hanger type profile. The arced hanger type grooves are connected to each other at their opposite lower ends, while corresponding feed outlet openings communicate with the grooves at top and central points thereof, respectively, and each groove has a cross-sectional area decreasing in a direction from the top and central point toward each lower end. The mandrel has, in place of the multi-staged dams with the straight grooves therebetween, a single dam for a downward melt flow positioned below the hanger type arced grooves and connected to the lower ends of the grooves. The hanger type grooves are defined between a corresponding circumferential flat land sealingly fitted to an inner peripheral surface of the mandrel and a pair of symmetrical lower flat lands, and the paired lower lands are defined between the paired hanger type grooves and the single dam. The hanger type grooves, the lower lands and the single dam have radial gaps or depths from a peripheral surface of the upper land with the lower land gap being smaller than the groove gap but larger than the dam gap over the entire periphery. The hanger type profile of the grooves is determined so as to have a melt pressure loss distributed substantially uniformly over the entire periphery of the dam.

According to the present invention, the housing may have first and second pairs of downward extending bypass holes formed therein to communicate an annular melt passage, defined between the housing and the mandrel, with the atmosphere therethrough for discharging the melt from outlet openings of the bypass holes to the exterior of die. The first paired bypass holes have inlet openings at diametrically opposite points of the inner housing surface facing diametrically opposite points of the mandrel where the hanger type grooves are connected to each other at the lower ends thereof, respectively, while the second paired bypass holes have inlet openings at other diametrically opposite points of the inner housing surface facing the feed outlet openings of the mandrel, respectively. The housing is provided with four valve means including plugs movably mounted within the bypass holes for selectively closing and opening the bypass holes at the inlet openings thereof, respectively.

Preferably, the annular melt passage of the die according to the present invention has an upper zone having a circularly annular cross section at least at the single dam, a lower zone having an elliptically annular cross section and an intermediate transitional zone therebetween, and the lower melt passage zone terminates at die lips having an elliptically annular profile. The upper melt passage zone is defined between a portion of the housing having an inner circular periphery, and an upper portion of the mandrel which portion forms: the upper land having a circular periphery; the paired hanger type grooves; the paired lower lands having arced peripheries; and the single dam having a circular periphery. The housing comprises a body having upper and lower hollow sections, a replaceable hollow main block and a replaceable hollow sub-block. The housing body has an annular bottom end internally stepped to form a first internal recess where the main block is received to define, with a lower portion of the mandrel and the core, at least a lower part of the intermediate melt zone and the lower melt zone with the die lips. The main block has an annular top end internally stepped to form a second recess where the sub-block is received to provide a second annular dam radially extending from the housing into the intermediate melt zone and sandwiched by the main block and the housing body. The core is detachably mounted to the mandrel at a lower end thereof.

According to the present invention, the main block and the core in combination are selected in respect of their profiles and sizes to determine a desired profile and size of the die lips so that the die is primarily adjusted to produce a parison having a predetermined cross-sectional profile and size, ejected through the entire melt passage and then die lips at a predetermined melt extrusion rate, assuming a pressure loss of the melt in the die is uniformly distributed at the die lips over the entire periphery thereof. The sub-block is selected or modified in respect of its profile and size to secondarily adjust the die so that the pressure loss at the die lips in practice is improved toward such a level as originally assumed.

In the meantime, the above mentioned elliptical periphery or profile has a pair of opposite sides with a smaller width therebetween being substantially linear and another pair of opposite sides with a longer width therebetween being convex.

According to the present invention, the elliptical core may have a pair of peripherally and radially extending opposite bars integrated therewith at the opposite shorter width sides of the core to form a pair of opposite dams for the downward melt flow, respectively. In a case where the housing is not allowed to be modified in respect of its profile and size, the core in conjunction with the housing is selected in respect of its profile and size to determine a desired profile and size of the die lips so that the die is primarily adjusted to produce a parison having a predetermined cross-sectional profile and size ejected through the die lips at a predetermined melt extrusion rate, assuming that a pressure loss of the melt in the die is uniformly distributed at the die lips over the entire periphery thereof. The above mentioned bars are selected or modified in respect of their profiles and sizes to secondarily adjust the die so that the pressure loss at the die lips in practice is improved toward such a level as originally assumed.

With respect to the above mentioned die involving the main block and the sub-block, the core may have such bars as above, and these bars may be selected or modified in respect of their profiles and sizes in conjunction with the sub-block to effect the secondary die adjustment.

DESCRIPTION OF THE PREFERRED EMBODIMENTS

Figure 1:
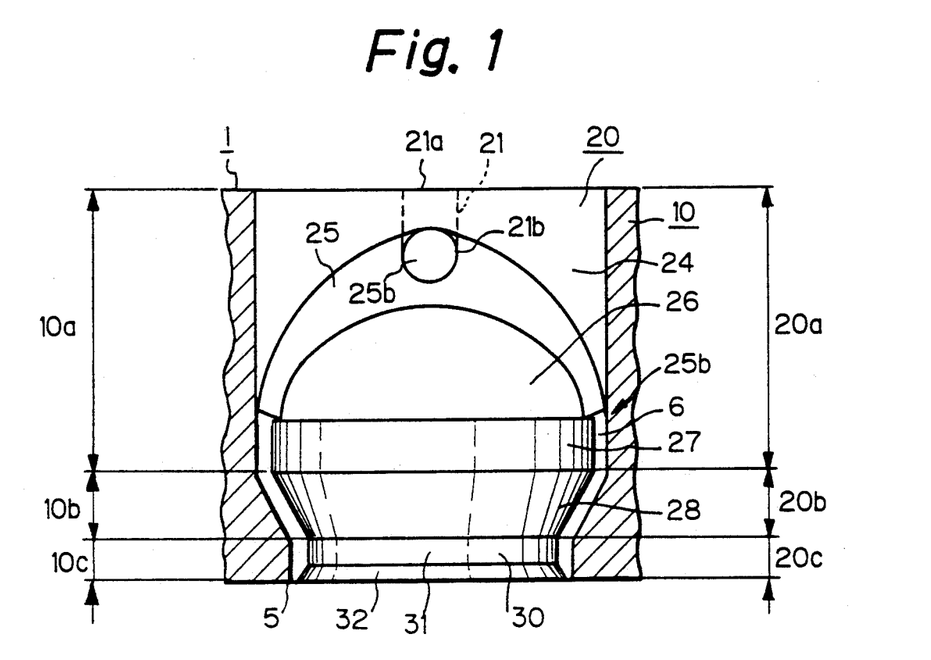
FIG. 1 shows a die according to the present invention with a housing in a vertically cross-sectional view and a mandrel with a core in a front view.
Figure 2:
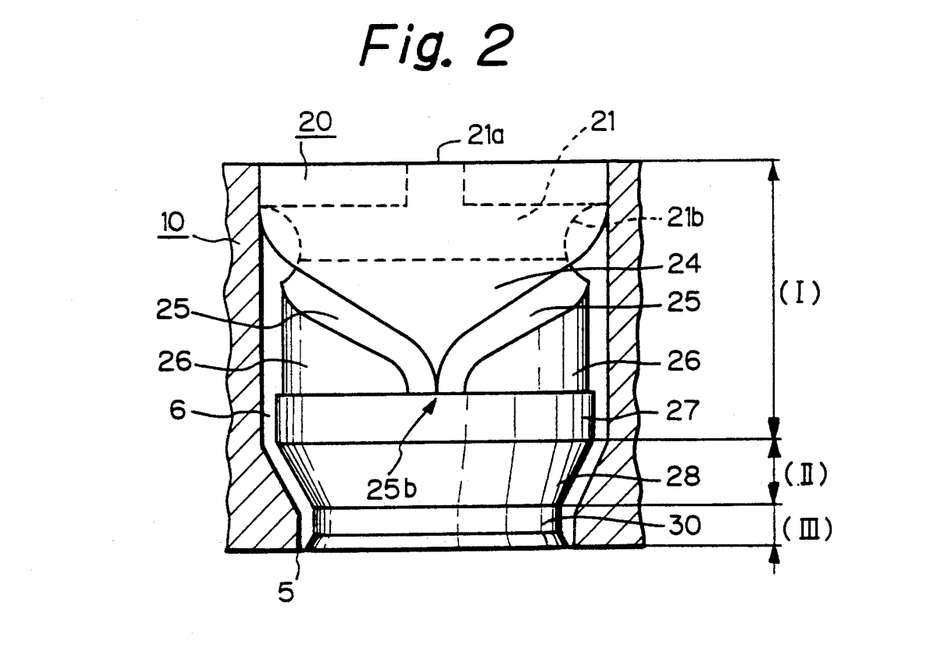
FIG. 2 shows the die of FIG. 1 with the housing in a vertically cross-sectional view and the mandrel with the core in side view.

Referring to FIGS. 1 and 2, a die 1 of the present invention has a hollow housing 10 and a mandrel 20 with a core 30 connected thereto. The core 30 has an upper part 31 and a lower part 32 connected to each other. The lower core part 32 and the housing 10 define die lips 5 having an annular profile therebetween, through which a melt is ejected to form a parison to be blow molded in a mold (not shown).

The mandrel 20 has a feed hole 21 for the melt from an extruder (not shown), which hole has an inlet opening 21a in a top portion of the mandrel 20 and is branched in that portion to open (21b) at a peripheral surface of the portion diametrically opposite thereto. The mandrel 20 has a lower portion 20b, and an upper portion 20a including the top portion having an originally circular cross-sectional profile. The upper portion 20a of the mandrel 20 is machined to form a circumferential upper land 24, a pair of grooves 25, a pair of lower lands 26 and a circumferential dam 27 projecting radially and extending horizontally.

The upper land 24 has a face formed by a portion of the original peripheral surface. The housing 10 has a lower section 10b, and an upper section 10a having a circular hollow space extending vertically. The upper land 24 of the mandrel 20 is sealingly fitted to an inner circular surface of the upper housing section. The paired grooves 25 are symmetrical relative to the axis of the mandrel and are defined between the upper land 24 and the lower lands 26, and the lower lands 26 are defined between the paired grooves 25 and the dam 27.

Figure 4:
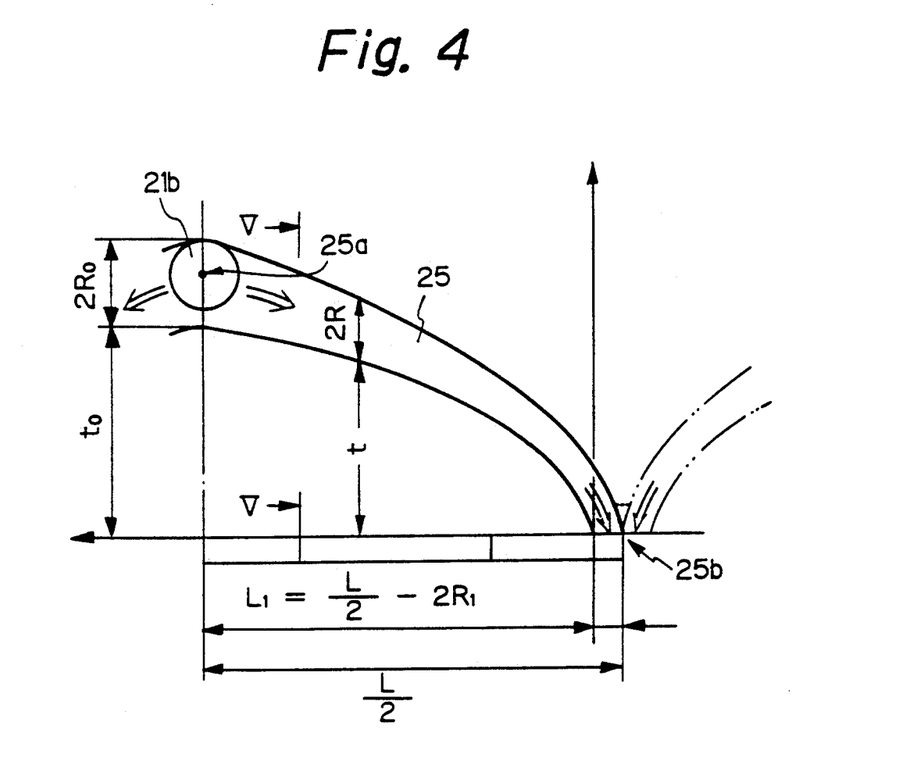
FIG. 4 is an enlarged developed front view of a mandrel according to the present invention.
Figure 5:
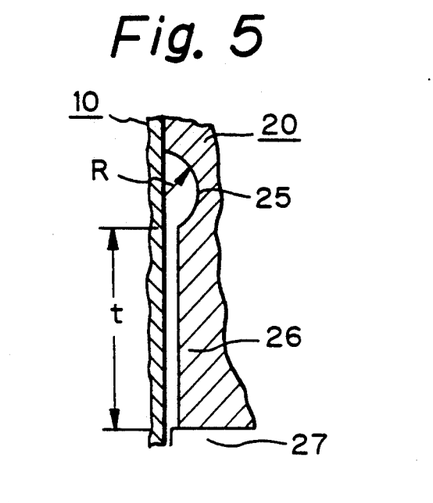
FIG. 5 is a cross-sectional view of the mandrel taken along lines VI—VI in FIG. 4.

Each groove 25 has an arced surface in a cross-sectional view, and extends oppositely sidewards and downwards in a developed front view of the mandrel as shown in FIG. 4, so that it has a hanger type profile. The hanger type grooves 25 are connected to each other at their opposite lower ends at joint points 25b.

The connection of the grooves 25 may be such that each lower end is in contact with a counterpart lower end at the joint point 25b as shown in FIG. 2.

The feed outlet openings 21b communicate with respective grooves 25 at top and central points 25a thereof. Each groove 25 has a cross-sectional area decreasing in a direction from the top and central point 25a toward each lower end at the joint point 25b.

Note: The land in the conventional die corresponds to the upper land 24 in the die according to present invention.

Figure 3:
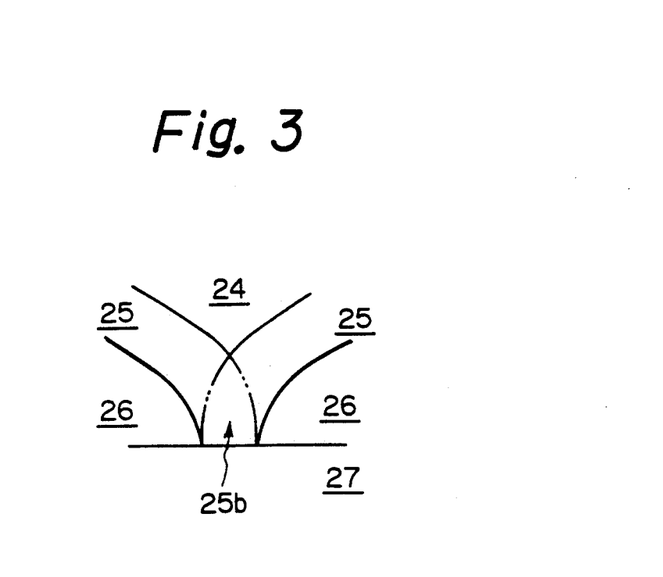
FIG. 3 is an enlarged side view showing a portion of an alternative mandrel according to the present invention where a pair of hanger type grooves are connected to each other at their lower ends.

Alternatively, each lower end may overlap to some extent with a counterpart lower end at the joint point 25b as shown in FIG. 3. The lower lands 26 have arced surfaces in a cross-sectional view. The dam 27 has a circular side surface in a cross-sectional view, an annular flat upper surface and a lower surface 28 tapered downwards.

The grooves 25, the lower lands 26 and the dam 27 have radial depths from the peripheral surface of the upper land 24, such that the lower land depth is smaller than the groove depth but larger than the dam depth over the entire periphery. The tapered lower surface 28 of the dam 27 is connected to a peripheral surface of the core 30.

The lower housing section 10b has a hollow space extending vertically and tapered downwards.

The housing 10 and the mandrel 20 with the core 30 define a melt passage having an upper zone (I), an intermediate zone (II) and a lower zone (III). The upper zone (I) continues from upper edges of the grooves 25 to a lower edge of the dam 27, the intermediate zone (II) continues from the lower edge of the dam 27 to an upper end of the core 30, and the lower zone (III) continues over the entire vertical length of the core 30 and terminates at the die lips 5.

Referring to FIG. 4, a radius R of each groove 25 is represented by $R_0$ at the top and central point 25a and $R_1$ at the joint 25b, and axis X represents a line along the horizontal upper surface of the dam 27, while axis Y represents an axial direction of the mandrel 20. L represents a horizontal length of the groove 25 or dam 27 from the top and central point 25a to the joint point 25b in a developed front view of the mandrel 20, and t represents a vertical height of the each lower land 26, that is from the lower edge of the groove 25 to the upper edge of the dam 27, and thus t represents a curvature, while $R/R_0$ represents a decreasing rate of the groove cross-sectional area.

According to the present invention, R and t above may be preferably represented by the following formulas, respectively:

$$R = k_1 X^a + R_1$$

$$t = k_2 X^b$$

Constants $k_1$, $k_2$, a and b above can be determined by experiments utilizing a function of a melt pressure loss, so that a pressure loss of the melt at dam lips 6 defined by the dam 27 and the housing 10 is substantially uniformly distributed over the entire periphery. For example, a degree of the substantial uniformity is not less than 0.95.

As a result of the experiments, a die of the present invention may be preferably designed using the above two formulas, where: L=500–1000 mm; $R_0$=10–40 mm; $R_1 = 5-30$ mm; $k_1 = R_0-R_1 = 0-30$; $k_2 = 80-230$; $k_2 = 80-230$; $a = 1/3-3/4$; and $b = 1/2-4/5$.

Further, it was confirmed that a die designed under the conditions where $a = \frac{1}{2}$ and $b = \frac{2}{3}$ renders the melt to be completely flown through the melt passage and discharged without any portion of the melt remaining in the melt passage, even in locations below the joint points 25b. Still further, it was confirmed that a basic melt passage configuration of the present invention improves the die so that a resin or color change is completed with a reduced amount of wasted resin in a significantly decreased period of time, and causes the fluidability of the melt in the die to be improved so as to effect a uniform distribution of the melt pressure loss at the dam lips 6.

With the die of the present invention, such islands and multi-staged dams with grooves as those of the conventional die are omitted, and thus such local portions of the melt remaining as those at the islands and the multi-staged dams with the grooves are eliminated.

Further, the die of the present invention is advantageous in that its vertical length is shortened, compared with that of the conventional die, by a vertical length of the multi-staged dams with the grooves minus a vertical length or thickness of the single dam 27, and thus its weight is considerably reduced.

The above embodied die of the present invention may be designed so that the upper melt passage zone (I) has either a circular periphery or an elliptical periphery over the entire length, as needed.

With respect to the intermediate melt passage zone (II) and the lower melt passage zone (III), which are defined by the lower tapered mandrel section 20b and the lower housing section 10b, their cross-sectional profiles must be designed, depending on a profile of the die lips 15 at the free end of the die. Such designs influence a pressure loss of the melt at the die lips 5, even if it is ensured by the above mentioned design involving FIG. 4 according to the present invention that a melt pressure loss at the dam lips 6 is substantially uniformly distributed over the entire periphery thereof.

In general, the lower housing section 10b, the lower mandrel portion 20b and the core 30 in combination are designed for a parison having a desired cross-sectional profile and size, so that the melt pressure loss is distributed substantially uniformly over the entire periphery. This design is made by trial and error with specific experiments and/or some die design experiences obtained so far, and thus it is in practice troublesome and difficult.

In this regard, according to one aspect of the present invention, with a predesigned mandrel 20 and housing 10 for use in producing a parison having a cross-sectional profile and size in a predetermined range, a core 30 is designed or determined in respect of its profile and size for a specific or nominal blow molded article so that die lips 5 have an elliptical cross-sectional profile required for producing the specific article at a predetermined melt extrusion rate, assuming that a melt pressure loss is uniformly distributed at the die lips 5 over the entire periphery. This may be called a "primary adjustment" of the die.

Figure 9:
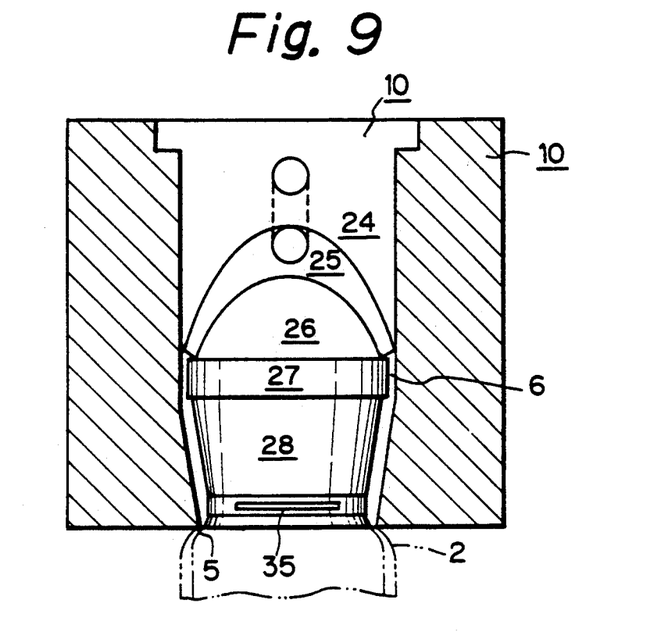
FIGS. 9 and 10 are views corresponding to FIGS. 1 and 2, respectively, and showing a die of the present invention with one embodiment of pressure loss adjusting means mounted to a core.
Figure 10:
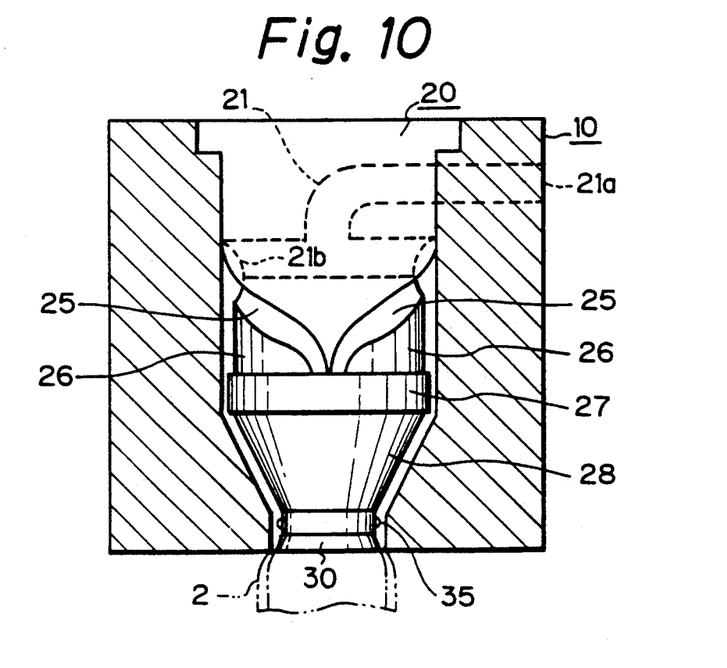
Figure 11:
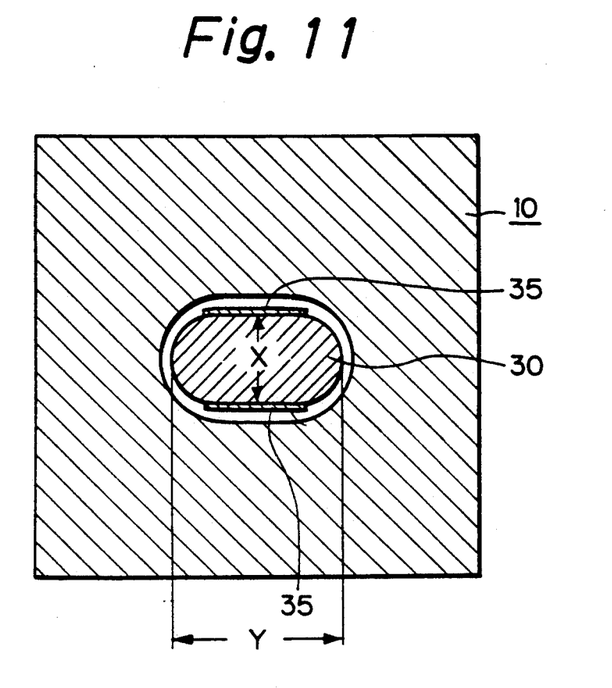
FIGS. 11 and 12 are horizontally cross-sectional views of dies according to the present invention showing a cross-sectional profile of a melt passage in the die at cores, respectively, FIG. 11 showing the core corresponding to that in FIG. 9 or 10.

On the above premise, the core 30 may be provided with a pair of horizontally extending bars 35 at opposite linear sides of the core 30 with a shorter width X therebetween, which core has an elliptical periphery as shown in FIGS. 9, 10 and 11, and the paired bars 35 are selected or modified in respect of their profiles and sizes, so that the melt in the die is subjected to a pressure loss at the die lips 15 distributed substantially uniformly over the entire periphery thereof, that is as originally assumed. This may be called a "secondary adjustment" of the die. The above modification of the bars 35 may be made by cutting and/or grinding the same or welding an additional material onto the same.

According to a conventional method, only an adjustment corresponding to the above mentioned primary adjustment is made in conjunction with selection of a part forming the lower die housing, so that the melt pressure loss is distributed substantially uniformly over the entire periphery in practice. This conventional adjustment of the die is troublesome and makes it difficult to do. In marked contrast, the above two-stage adjustment of the die according to the present invention is advantageous in obtaining a die for use in producing a parison having a desired elliptical profile and size.

Figure 12:
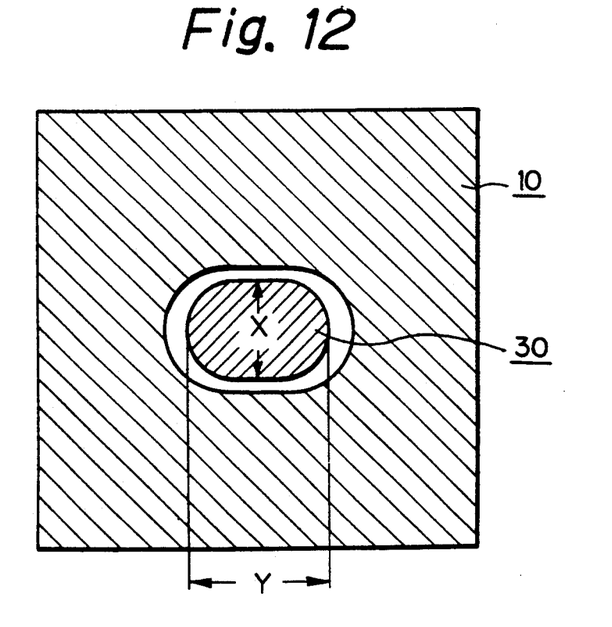

In the meantime, it will be understood that a die for use in producing a parison having a desired circular profile and size makes it simple to adjust the die for the desired parison, since such a die requires only the above mentioned primary adjustment of the present invention for the reason that, so long as the upper melt passage zone (I) is subjected to a melt pressure loss which is distributed substantially uniformly at the dam lips 6 over the entire periphery, and so long as the intermediate (II) and lower (III) melt passage zones have a circular cross section over the entire vertical or axial length, it would be ensured that a melt pressure loss at the die lips 5 having a circular profile is distributed substantially uniformly over the entire periphery thereof. In contrast, even if the intermediate (II) and lower (III) melt passage zones had an elliptical cross section which is completely similar to an elliptical profile of the die lips 5 over the entire vertical or axial length, a uniform distribution of the melt pressure loss at the die lips 5 over the entire periphery thereof would not be effected. In this assumed case, the melt pressure loss at the die lips 5 would be definitely larger at the opposite shorter width sides (i.e., linear sides) of the core 30 than the other opposite larger width sides (i.e., convex sides) having a width Y therebetween (see FIG. 12).

Note: In a practical case of a die involving die lips 5 having an elliptical profile, the lower melt passage zone (III) has an elliptical cross-sectional profile which is not always similar to the profile of the die lips 5, while the intermediate melt passage zone (II) has a cross-sectional profile transitionally changed between a circular profile of the dam lips 6 and the elliptical profile of the lower melt passage zone (III). In this regard, the intermediate melt passage zone (II) may be called an "intermediate transitional zone".

Figure 13:
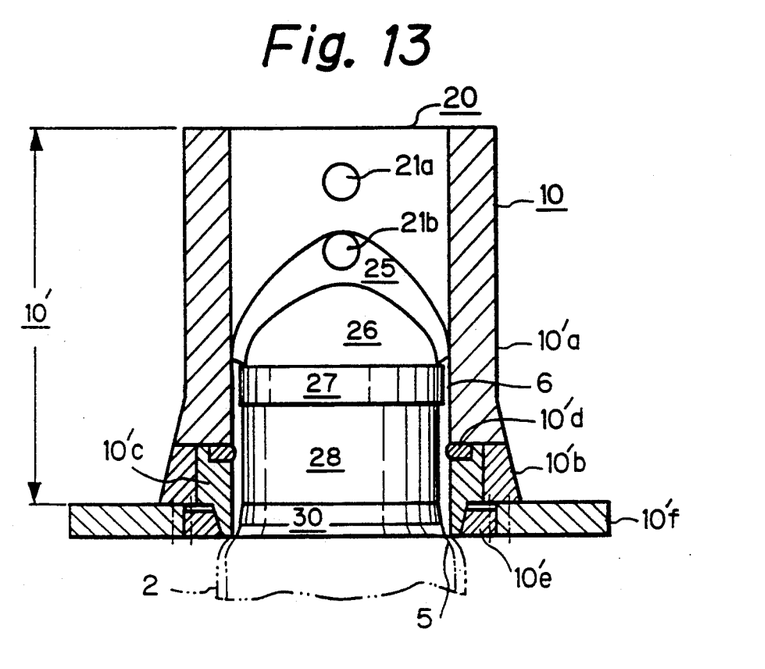
FIGS. 13 and 14 are views corresponding to FIGS. 1 and 2, respectively, and shows a die of the present invention with another embodiment of the pressure loss adjusting means mounted on a die housing.
Figure 14:
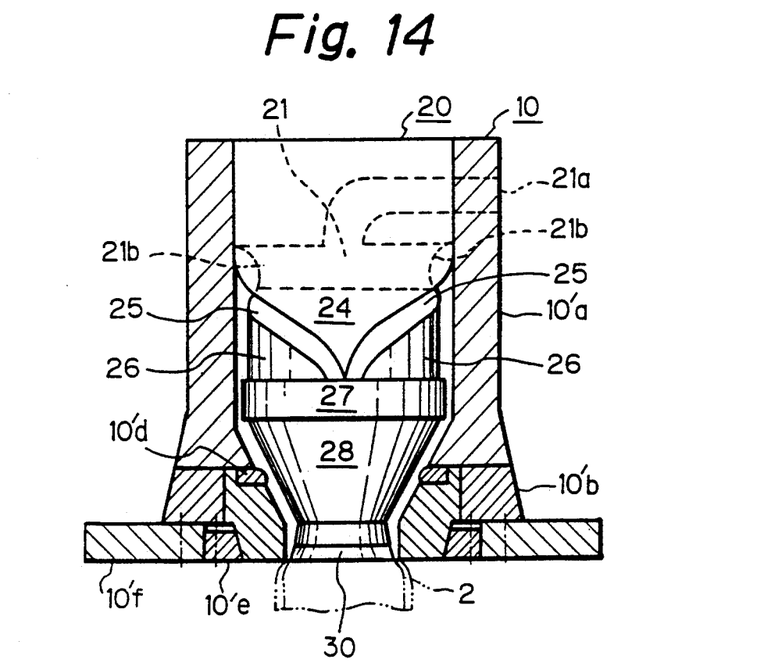

According to another aspect of the present invention, the above mentioned primary and secondary adjustments of the die may be made as follows:

Referring to FIGS. 13 and 14, showing a die having a housing 10, a mandrel 20, a core 30 and die lips 5 having an elliptical profile corresponding to those of the die as shown in FIGS. 1 and 2, the housing 10 comprises a body 10' having upper and lower hollow sections 10'a and 10'b, a replaceable hollow main block 10'c, a replaceable hollow sub-block 10'd, an upwardly converging annular wedge 10'e and a die lip reinforcing means of a horizontal bottom plate form having a central hole defined so as to receive the main block 10'c with an annular space gap therebetween for the wedge 10'e.

The entire housing body 10' has an annular bottom end internally stepped to form an internal recess defined by an internal peripheral surface of the lower body section 10'b and a bottom surface of the upper body section 10'a. The recess of the housing body 10' is intended to receive the main block 10'c with the sub-block 10'd being sandwiched by the bottom surface of the upper body section 10'a and the main block 10'c.

The reinforcing bottom plate 10'f is connected to the lower housing body section 10'b at a bottom thereof by bolts. The wedge 10'e is urged into the annular space gap between the reinforcing bottom plate 10'f and the main block 10'c so that the wedge 10'e abuts against the main block 10'c in vertical and radial directions at an inclined surface of the main block 10'c, while the wedge 10'e abuts against the reinforcing bottom plate 10'f in a radial direction at a horizontal inner surface of the plate 10'f, and the wedge 10'e is connected to the lower housing body section 10'b at the bottom thereof by bolts. As a result, the main block 10'c with the sub-block 10'd is held in the recess of the housing body 10' by the wedge 10'e and the bolts, so that the main block 10'c and the sub-block 10'd in combination form an inner peripheral surface of at least a lower portion of the lower melt passage zone (III).

The sub-block 10'd is designed so that it projects radially into the lower melt passage zone (III) over its entire periphery, when it is mounted with the main block 10'c in the die.

The reinforcing plate 10'f may have a rectangular form, while the housing body 10' may have either a circular or a rectangular form, and the plate 10'f has a considerably larger size (width) in a direction of the shorter width X of the core 30, relative to the housing body 10'. The plate 10'f is intended to prevent the elliptical cross-sectional profile of the die lips 5 due to its rigid property from being deformed by a melt pressure at the linear sides (having the shorter width X) of the elliptical profile. This technology is disclosed in U.S. patent application No. 705,966 or JP-A 4-31026, where the previously mentioned conventional die is also disclosed.

According to the invention, the core 30 and the main block 10'c are selected in respect to their profiles and sizes to determine a desired profile and size of the die lips 5 so that the die is primarily adjusted to produce a parison having a predetermined cross-sectional profile and size ejected through the melt passage and then the die lips 5 at a predetermined melt extrusion rate, assuming that a melt pressure loss in the die is uniformly distributed at the die lips 5 over the entire periphery thereof.

Following the primary adjustment of the die as such, the sub-block 10'd is selected or modified in respect of its profile and size to secondarily adjust the die so that the melt pressure loss at the die lips 5 in practice is improved toward such a level as originally assumed.

Alternatively, the core 30 may have such adjusting means as the bars 35 as shown in FIGS. 9 and 10, so that such bars are selected or modified in respect of their profiles and sizes in conjunction with the sub-block 10'd to effect the secondary die adjustment.

The modification of the sub-block 10'd may be made by cutting and/or grinding the sub-block 10'd at an inner peripheral end thereof, or by welding an additional material to the sub-block 10'd.

As previously stated, the die of the present invention is improved relative to the conventional die such that the melt remaining phenomenon in the melt passage is considerably eliminated. However, even the die of the present invention as shown in FIGS. 1, 2, 9, 10, 13 and 14 does not prevent the melt completely from remaining at any local portions of the melt passage in practical use.

Figure 6:
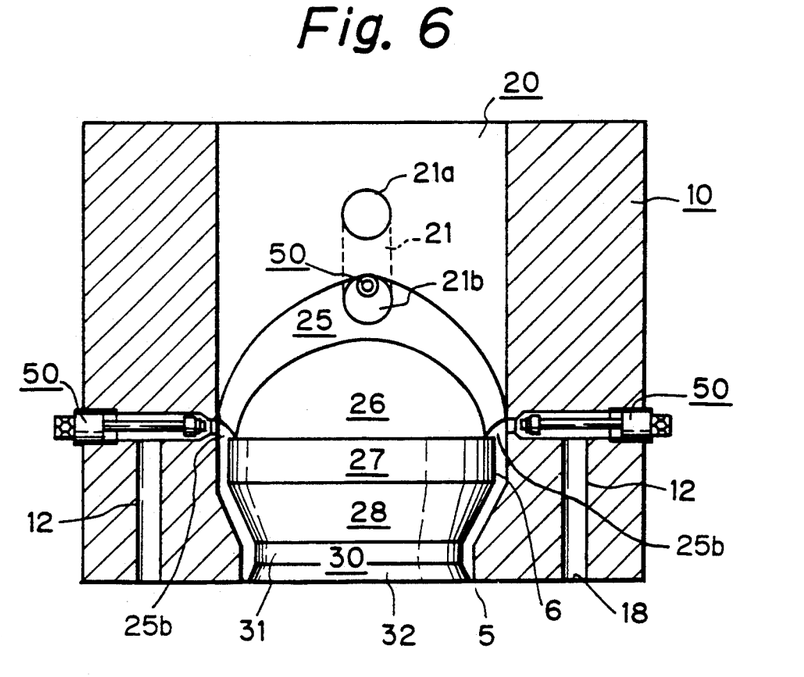
FIGS. 6 and 7 are views corresponding to FIGS. 1 and 2, respectively, and showing a die of the present invention provided with melt discharging means.
Figure 7:
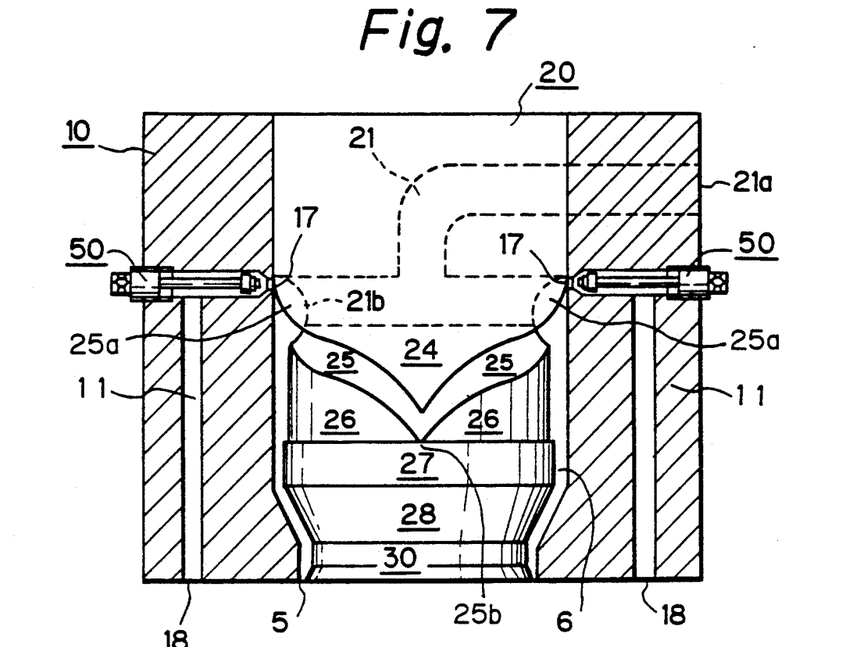
Figure 8:
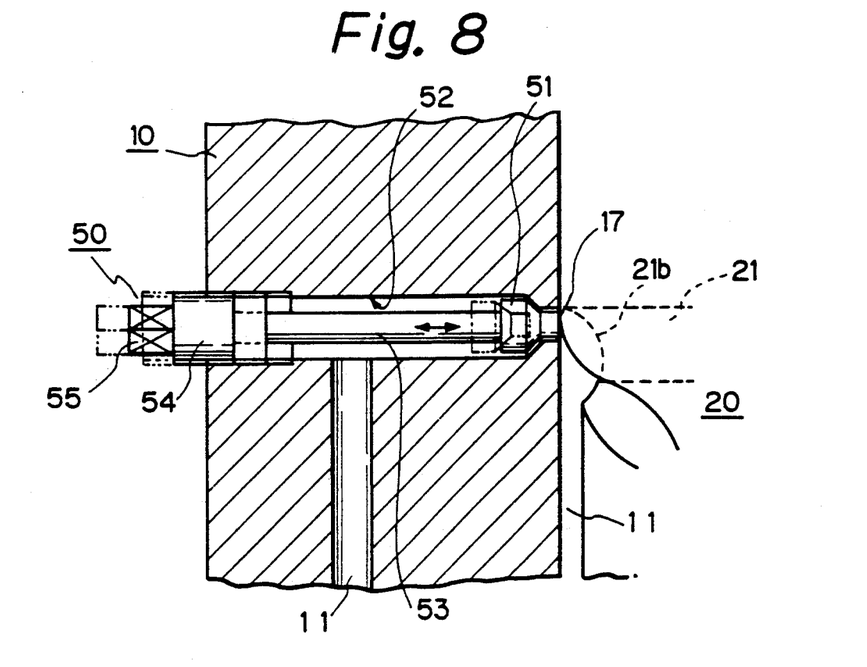
FIG. 8 is an enlarged cross-sectional view illustrating the melt discharging means shown in FIG. 6.

In this regard, in order to further improve the die in respect of the melt remaining phenomenon, melt discharging means may be provided in the die as follows:

Referring to FIGS. 6, 7 and 8 showing a die corresponding to that as shown in FIGS. 1 and 2, a corresponding house 10 has first and second pairs of downwardly extending bypass holes 11 and 12 formed to communicate a melt passage, defined between the housing 10 and a corresponding mandrel 20 with a corresponding core 30, with the atmosphere therethrough. The bypass holes 11 and 12 are intended to discharge the melt from their outlet openings 18 at a bottom surface of the housing 10 to the exterior of the die.

The first pair of bypass holes 11 have inlet openings 17 at diametrically opposite points of an inner housing surface, which points face the mandrel 20 at diametrically opposite points 25b where a pair of corresponding hanger type grooves 25 are connected or jointed to each other at lower ends thereof, respectively. The second pair of bypass holes 12 have inlet openings 17 at diametrically opposite points of the inner housing surface, which points face a pair of corresponding feed outlet openings 21b of the mandrel 20 or top and central points of the grooves 25, respectively.

The housing 10 has four valves 50 including plugs 51, each mounted in a top portion, having the inlet opening 17, of a corresponding bypass hole 11 or 12. Each valve 50 comprises a radially extending hole 52 integrated with the top portion of the bypass hole 11 or 12, and a plunger 53 having the plug 51 at an inner end thereof. The plunger has a threaded outer end portion 54 with a nut 55, and is screwed into the hole 52, so that the plug 51 closes the inlet opening 17 in a closed valve position as shown by solid lines in FIG. 8.

When the valve is in an opened position, as shown by dotted lines in FIG. 8, where the plunger is moved backwards by screwing the plunger in a reverse direction, the plug 51 is apart from the inlet opening 17 so that the melt is allowed to enter into the hole 52, pass over a periphery of the plug 51 and enter into a lower portion of the bypass hole. In this connection, the plunger has a radially inner portion carrying the plug 51 at an inner end thereof, which portion has a diameter smaller than that of the plug 51, while the plug has a inwardly converging profile in a stepped form, and the horizontal hole 52 has a diameter larger than that of an outer portion of the plug 51, while the plug outer portion has a diameter larger than that of an inner plug portion which can sealingly fit to the inlet opening 17.

The melt discharging means provided in the die as above can be operated when the resin or color change is required. Particularly, the means can be operated while a new resin or a different colored resin is injected into the die from the extruder. As a result, the resin or color change operation is considerably shortened in time, compared with that involved in the conventional die.

Further, according to the present invention, since a degree of opening of the valve 50 can be adjusted by a screwing operation with the plug 51, it is advantageous in some cases to have the valve 50 adjusted to maintain the opened degree at an appropriate level while the blow molding operation is carried out with the same colored resin with the result that the melt is ejected from the die lips 5 through the melt passage in the die to produce a parison 2, while some small part of the melt is discharged through the valve 50 and then the discharging holes 11 and 12.

Generally speaking, the joint points 25b of the hanger type grooves 25 are apt to cause the parison to have "weld lines" formed at a surface thereof, since the melt from the grooves 25 is jointed at the points 25b.

Occurrence of such weld lines may depend on a design of the die at the joint points 25b, extruding conditions and also the melt properties.

The above mentioned melt discharging operation during the blow molding operation eliminates such weld lines at the produced parison.

The present invention described above is advantageous in various aspects over the prior art, and is preferably applied to embody a blow molding die for use in producing articles of "engineering plastic", which is required due to its inherent property to be ejected at a relatively high speed from the extruder, and is also preferably applied to blow molding cases wherein a profile and size of the blow molded articles are often changed and/or a resin or color change operation for articles having the same profile and size is often carried out.

We claim:

1. A die positioned in a blow molding apparatus comprising an extruder and a mold, for providing a parison of plasticized resin melt for use in producing hollow molded resin articles, said die comprising a vertically extending tubular housing and an integrated combination of a mandrel and a core, mounted in said housing to thus define a peripheral space gap therebetween providing an annular and axial melt passage, said die having a feed hole for the melt from the extruder, said feed hole communicating with said melt passage, said melt passage forming die lips defined by said core and said housing at a lower free end of said die, through which the parison is provided for the blow molding, said mandrel having said feed hole formed such that it has an inlet opening at a top end portion of said mandrel and is branched to form a pair of diametrically opposite outlet openings in the top end portion at a peripheral surface thereof, wherein said mandrel has a pair of grooves symmetrical relative to its axis, defining with an inner surface of said housing, symmetrical manifolds, each groove having an arced surface in a cross-sectional view and extending oppositely sidewards and downwards in a developed front view of said mandrel so that it has a hanger shaped profile, said symmetrical hanger shaped grooves being connected to each other at their opposite lower ends, while said feed outlet openings communicate with said grooves at top and central points thereof, respectively, each groove having a cross-sectional area decreasing in a direction from the top and central point thereof toward each lower end thereof; said mandrel has a radially extending circumferential dam for a downward melt flow positioned below said grooves, and connected to the lower ends of said grooves; and said mandrel has an upper flat circumferential land and a pair of symmetrical semi-circumferential lower lands positioned such that said grooves are defined between said upper and lower lands, while said lower lands are defined between said grooves and said dam, wherein said grooves, said lower lands and said dam have radial depths from a peripheral surface of said upper land, said lower land depth being smaller than said groove depth but larger than said dam depth over the entire periphery, while said upper land is sealingly fitted to the inner peripheral surface of said housing at its peripheral surface; said hanger shaped profile being determined so as to have a melt pressure loss distributed substantially uniformly over the entire periphery of said dam.

2. A die according to claim 1, wherein said housing has first and second pairs of downwardly extending bypass holes formed therein to communicate said melt passage with the atmosphere therethrough for discharging the melt from outlet openings thereof to the exterior of said die, said first paired bypass holes having inlet openings at diametrically opposite points of the inner housing surface facing diametrically opposite points of said mandrel where said paired grooves are connected to each other at the lower ends thereof, respectively, while said second paired bypass holes have inlet openings at the other diametrically opposite points of the inner housing surface facing said feed outlet openings of said mandrel, respectively, wherein said housing is provided with four valve means including plugs movably mounted within said bypass holes for selectively closing and opening said bypass holes at said bypass inlet openings, respectively.

3. A die according to claim 1 or 2, wherein said melt passage has a circularly annular cross section over at least a vertical length from said dam to said die lips having a circularly annular profile.

4. A die according to claim 1 or 2, wherein said melt passage has an elliptically annular cross section over at least a vertical length from a lower edge of said dam to said die lips having an elliptically annular profile.

5. A die according to claim 1 or 2, wherein said annular melt passage has an upper zone having a circularly annular cross section at least at said dam, a lower zone having an elliptically annular cross section and an intermediate transitional zone therebetween, said lower melt passage zone terminating at said die lips having an elliptically annular profile.

6. A die according to claim 5, wherein (1) said upper melt passage zone is defined between an upper portion of said housing having an inner circular periphery, and an upper portion of said mandrel forming: said upper land having a circular periphery; said paired grooves; said paired lower lands having arced peripheries; and said dam having a circular periphery, (2) said core is replaceably mounted to said mandrel at a lower end thereof, said core having an elliptical periphery having a pair of opposite sides with a smaller width therebetween being substantially linear and another pair of opposite sides with a longer width therebetween being convex, said core having a pair of peripherally and radially extending opposite bars integrated therewith to form a pair of second dams for the downward melt flow at the opposite shorter width sides of said core, respectively, wherein said core in conjunction with a lower portion of said housing is selected in respect of its profile and size to determine a desired profile and size of said die lips so that said die is primarily adjusted to produce the parison having a predetermined cross-sectional profile and size ejected from said die lips at a predetermined melt extrusion rate, assuming that a pressure loss of the melt in said die is uniformly distributed over the entire periphery of said die lips; and said paired bars are selected or modified in respect of their profiles and sizes to secondarily adjust said die so that the pressure loss at said die lips in practice is improved toward such a level as originally assumed.

7. A die according to claim 6, wherein said lower housing body section is formed by a replaceable part, and is selected in respect of its profile and size in conjunction with said core to effect said primary die adjustment.

8. A die according to claim 5 wherein
(1) said upper melt passage zone is defined between an upper portion of said housing having an inner circular periphery, and an upper portion of said mandrel in which said mandrel portion forms: said upper land having a circular periphery; said paired grooves; said paired lower lands having arced peripheries; and said dam having a circular periphery;
(2) said housing comprises a body having upper and lower hollow sections, a replaceable hollow main block and a replaceable hollow sub-block; said housing body having an annular bottom end internally stepped to form a first internal recess wherein said main block being received to define, with a lower portion of said mandrel and said core, at least a lower part of said intermediate transitional melt passage zone and said lower melt passage zone with said die lips; said main block having an annular top end internally stepped to form a second internal recess wherein said sub-block is received to provide a second annular dam radially extending from said housing into said intermediate transitional melt passage zone and sandwiched by said main block and said housing body therebetween;
(3) said core is detachably mounted to said mandrel at a lower end thereof,
wherein said main block and said core in combination are selected in respect of their profiles and sizes to determine a desired profile and size of said die lips so that said die is primarily adjusted to produce the parison having a predetermined cross-sectional profile and size from said die lips at a predetermined melt extrusion rate, assuming that a pressure loss of the melt in said die is uniformly distributed at the die lips over the entire periphery thereof, and said sub-block is selected or modified in respect of its profile and size to secondarily adjust said die so that the pressure loss at said die lips in practice is improved toward such a level as originally assumed.

9. A die according to claim 8, further comprising an upwardly converging annular wedge means and a die lip reinforcing means of a horizontal bottom plate form having a central hole defined so as to receive said main block with an annular space gap therebetween for said wedge means, said wedge means being disposed into said space gap to abut against said reinforcing plate means at least radially and said main block radially and axially, and fixed to said lower body section by first bolt means, while said reinforcing plate means is fixed to said lower body section by second bolt means.

10. A die according to claim 8, wherein said core has an elliptical periphery having a pair of opposite sides with a smaller width therebetween being substantially linear and another pair of opposite sides with a longer width therebetween being convex; said core having a pair of peripherally and radially extending opposite bars integrated therewith to form a pair of third dams for the downward melt flow at the opposite shorter width sides of said core, respectively,
wherein said paired bars are selected or modified in respect of their profiles and sizes in conjunction with said sub-block to effect said secondary die adjustment.

11. A die according to claim 10, further comprising an upwardly converging annular wedge means and a die lip reinforcing means of a horizontal bottom plate form having a central hole defined so as to receive said main block with an annular space gap therebetween for said wedge means, said wedge means being disposed into said space gap to abut against said reinforcing plate means at least radially and said main block radially and axially, and fixed to said lower body section by first bolt means, while said reinforcing plate means is fixed to said lower body section by second bolt means.

* * * * *